(No Model.)
R. W. IRWIN.
Spring Bumper.
No. 232,723.        Patented Sept. 28, 1880.
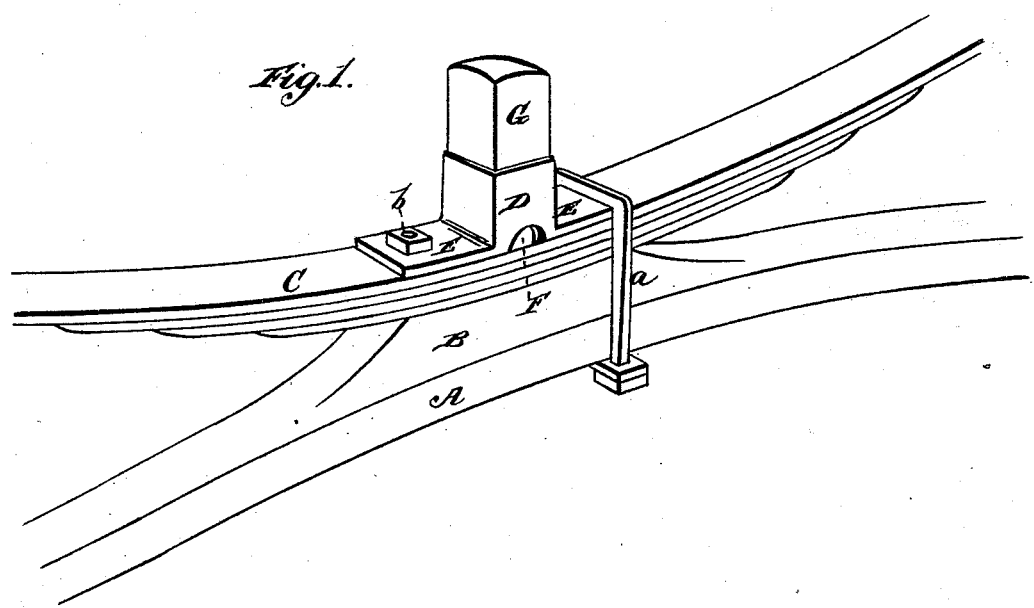
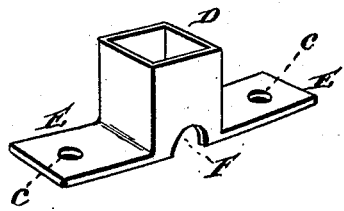 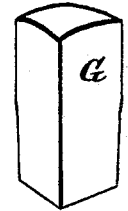
WITNESSES        INVENTOR
Robert Everett,        Robert W. Irwin,
James J. Sheehy.     By his Attorney   J. Clement Smith.

UNITED STATES PATENT OFFICE.

ROBERT W. IRWIN, OF ST. FRANCISVILLE, ILLINOIS, ASSIGNOR OF ONE-HALF OF HIS RIGHT TO AUGUSTUS T. LAVLETT, OF SAME PLACE.

SPRING-BUMPER.

SPECIFICATION forming part of Letters Patent No. 232,723, dated September 28, 1880.

Application filed July 14, 1880. (No model.)

*To all whom it may concern:*

Be it known that I, ROBERT W. IRWIN, of St. Francisville, in the county of Lawrence and State of Illinois, have invented certain new and useful Improvements in Spring-Bumpers for Vehicles; and I do hereby declare that the following is a full, clear, and exact description of the construction and operation of the same, reference being had to the accompanying drawings, forming part of this specification, in which—

Figure 1 is a perspective view, and Figs. 2 and 3 are detail views of the socket and rubber cushion.

The invention has relation to spring bumpers or supports for overburdened springs of vehicles; and it consists in the features of construction and combination hereinafter fully described, and particularly pointed out in the claim.

Referring by letter to the drawings, A indicates the axle, B the axle-bed, and C the lower portion of the elliptical spring to which the bumper is to be applied.

D designates a metallic socket having arms E E, curved to conform to the concave of the spring C, and openings F, to permit the air to escape when the cushion or bumper G, of rubber, is driven into the socket by concussion. The rubber cushion is of a form that will admit of its insertion into the socket, and it is acted upon by the upper portion of the elliptical spring C receiving the shock when the spring is compressed, thereby preventing breakage of the spring and lessening the jar to the occupant of the vehicle and to the load and the parts of the vehicle above the running-gear when the vehicle is being drawn over a rough road.

To secure the socket to the spring I employ either clips *a* or bolts *b*, as shown. When bolts are used the arms E must be perforated, as at *c*, and the bolts passed through the lower portion of the spring, the axle-bed, and the axle. The clips are preferable, and surround instead of penetrating the parts mentioned.

I am aware that two metal cups, secured one to the upper and the other to the lower half of the spring, have been employed in connection with an elastic ball suspended or held in place between them by a rod, as shown in Patent No. 67,782, of August 13, 1867, and this construction is not claimed herein.

Having thus fully described my invention, what I claim as new, and desire to secure by Letters Patent, is—

The herein-described spring-bumper for vehicles, consisting of the rectangular socket D, provided with the openings F, and the arms E, conforming to the curvature of the spring, in combination with the clips *a* and the rectangular cushion G, constructed and operating substantially as and for the purposes set forth.

ROBERT W. IRWIN.

Witnesses:
J. M. JOHNSON,
L. G. PITMAN.